C. SIPPLE.
FRICTIONAL GEARING.
APPLICATION FILED DEC. 31, 1912.
1,088,466.
Patented Feb. 24, 1914.
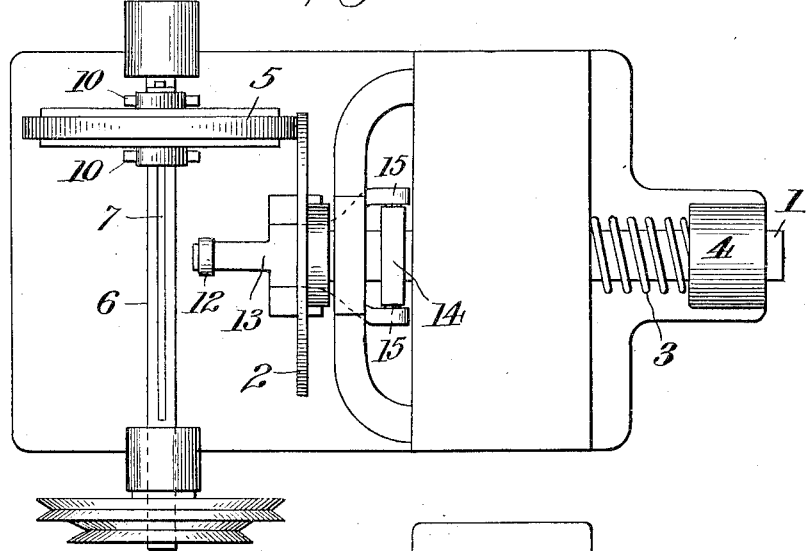
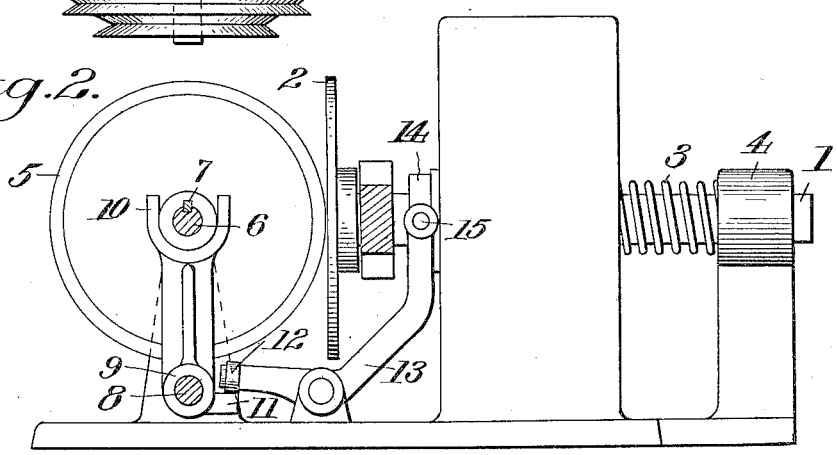
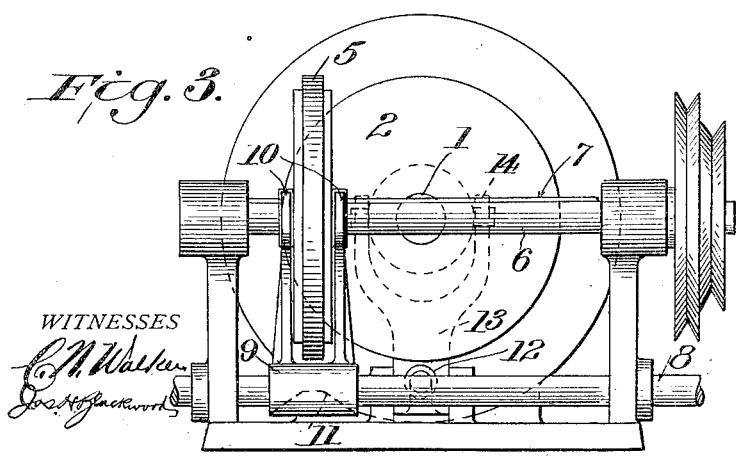
WITNESSES
Cahall Sipple
INVENTOR
Edward W. Holmes
Attorney.

UNITED STATES PATENT OFFICE.

CAHALL SIPPLE, OF DOVER, DELAWARE.

FRICTIONAL GEARING.

1,088,466.  Specification of Letters Patent.  Patented Feb. 24, 1914.

Application filed December 31, 1912. Serial No. 739,579.

*To all whom it may concern:*

Be it known that I, CAHALL SIPPLE, a citizen of the United States, residing at Dover, in the county of Kent and State of Delaware, have invented certain new and useful Improvements in Frictional Gearing, of which the following is a specification.

My invention relates to improvements in dental motors; and the object of my invention is to provide a simple means for automatically reversing the motion of the friction wheel and keeping the friction wheel and friction disk out of contact at a given point.

The details of construction of my invention are set forth in the accompanying description and drawings and the invention more particularly defined in the claims.

In the drawings: Figure 1 is a plan view of my frictional gearing; Fig. 2 is a side view showing the parts held out of contact; and Fig. 3 is an end view showing the manner of operating the friction wheel over the face of the disk.

Referring to the drawings, 1 represents the main driving shaft to which the friction disk 2 is attached, 3 is a spring which abuts the bearing 4 at one end and the rotor at its other extremity.

5 is the friction wheel slidably mounted upon the shaft 6 by means of the feather 7; the slide-rod 8 has a hub 9 fixed thereto and movable therewith which hub supports the forks 10 which engage the respective sides of the wheel 5 for the purpose of shifting said wheel across the face of the disk; the hub 9 also carries the two-faced cam 11 which is adapted to engage the roller 12 at one end of the lever 13, the other end of which lever terminates in a fork the prongs of which, 14, engage the trunnions 16 on the sleeve 15.

The operation of the device is as follows: Presuming the friction wheel to be at the dead center, as shown in Fig. 2, and the motor started; the shaft 1, carrying the disk, will rotate but the shaft 6, carrying the friction wheel, will remain stationary as the shaft 1 is held out of contact with the friction wheel by means of the sleeve 15 actuated by the lever 13, cam 11 and roller 12 pushing against the pressure of the spring 3. A slow motion will be imparted to the disk in one direction by slightly pushing the slide-rod 8, whereupon the roller 12 will drop off cam 11 and release the pressure on the spring, through the medium of the lever 13, and motion may be accelerated at will by continuing to push the slide-rod in the same direction toward the outer circumference of the disk. In order to reverse the motion it is necessary only to pull the slide-rod 8 past the dead center and the speed may be increased in the opposite direction, as the friction wheel is adapted to be moved entirely across the face of the disk and to engage said disk at every point in its circumference excepting at the dead center where the disk is automatically held from contact therewith and consequent wear of the parts prevented.

What I claim is:

1. In a friction drive, the combination of a friction disk, a wheel coöperating with said disk, means for shifting the friction wheel across the entire face of said disk, and means for automatically holding the disk from contact with said wheel at the center of the said disk.

2. In a friction drive, the combination of a friction disk, a wheel coöperating with said disk, a slide-rod having connections for shifting said wheel across the face of said disk, and means for automatically holding the disk from contact with said wheel at the center of said disk.

3. In a friction drive, the combination of a friction disk, a friction wheel coöperating with said disk, means adapted to hold said disk away from said wheel at the center of said disk, and means coöperating with the aforesaid means for shifting the friction wheel entirely across the face of said disk whereby a reverse motion and an instantaneous stoppage of said wheel may be effected.

4. In a friction drive, the combination of a friction disk, a friction wheel coöperating with said disk, a slide-rod having a hub, forks made integral with said hub and adapted to engage the respective sides of the friction wheel, said hub having a cam formed thereon, and means coöperating with said structure whereby the disk is held from contact with said friction wheel at its central point.

In testimony whereof I affix my signature in presence of two witnesses.

CAHALL SIPPLE.

Witnesses:
AVERY BERRY,
JOHN B. WHARTON.